United States Patent
Romanov et al.

(10) Patent No.: US 10,145,257 B2
(45) Date of Patent: Dec. 4, 2018

(54) BLADE OUTER AIR SEAL

(71) Applicant: United Technologies Corporation, Hartford, CT (US)

(72) Inventors: Dmitriy A. Romanov, Wells, ME (US); Paul M. Lutjen, Kennebunport, ME (US); Kevin J. Ryan, Alfred, ME (US); Ken F. Blaney, Middleton, NH (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 517 days.

(21) Appl. No.: 14/885,278

(22) Filed: Oct. 16, 2015

(65) Prior Publication Data

US 2017/0107841 A1    Apr. 20, 2017

(51) Int. Cl.
*F01D 11/08*    (2006.01)
*F01D 25/12*    (2006.01)
(Continued)

(52) U.S. Cl.
CPC .............. *F01D 11/08* (2013.01); *F01D 11/02* (2013.01); *F01D 25/12* (2013.01); *F16J 15/44* (2013.01); *F05D 2220/32* (2013.01); *F05D 2240/11* (2013.01); *F05D 2240/55* (2013.01); *F05D 2250/314* (2013.01); *F05D 2260/20* (2013.01)

(58) Field of Classification Search
CPC . F01D 11/08; F01D 11/02; F01D 25/12; F16J 15/44; F05D 2250/314; F05D 2260/20; F05D 2240/55; F05D 2220/32; F05D 2240/11
See application file for complete search history.

(56) References Cited

U.S. PATENT DOCUMENTS 5,375,973 A * 12/1994 Sloop ...................... F01D 11/08
                                                                 415/115
5,584,651 A * 12/1996 Pietraszkiewicz ...... F01D 11/08
                                                                 415/115
(Continued)

FOREIGN PATENT DOCUMENTS

EP    2914816    9/2015

OTHER PUBLICATIONS

Invitation pursuant to Rule 62a(1) EPC dated Feb. 15, 2017 in European Application No. 16192466.7.
(Continued)

*Primary Examiner* — Eldon Brockman
(74) *Attorney, Agent, or Firm* — Snell & Wilmer L.L.P.

(57) ABSTRACT

According to various embodiments, disclosed is a blade outer air seal assembly for a turbine engine comprising a main body portion that extends generally axially, with respect to a central axis of the turbine engine, from a leading edge portion of the main body to a trailing edge portion of the main body, wherein the leading edge portion includes a leading edge wall having a undercut profile along at least a portion of the leading edge wall, wherein the main body portion comprises cooling passages comprising a leading edge cooling passage adjacent to the leading edge wall, having a leading edge periphery on a side of the leading edge cooling passage adjacent to the leading edge wall, which generally conforms to the undercut profile of the leading edge wall.

17 Claims, 4 Drawing Sheets

(51) Int. Cl.
*F01D 11/02* (2006.01)
*F16J 15/44* (2006.01)

(56) References Cited

U.S. PATENT DOCUMENTS

| | | | | |
|---|---|---|---|---|
| 7,517,189 B2* | 4/2009 | Camus | ................. | F01D 9/04 |
| | | | | 415/173.1 |
| 7,665,962 B1* | 2/2010 | Liang | ................. | F01D 11/24 |
| | | | | 415/115 |
| 7,704,039 B1 | 4/2010 | Liang | | |
| 8,556,575 B2* | 10/2013 | Knapp | ................. | F01D 5/20 |
| | | | | 415/115 |
| 8,596,963 B1* | 12/2013 | Liang | ................. | F01D 11/12 |
| | | | | 29/889.22 |
| 2007/0041827 A1* | 2/2007 | Camus | ................. | F01D 9/04 |
| | | | | 415/116 |

OTHER PUBLICATIONS

Extended European Search Report dated May 16, 2017 in European Application No. 16192466.7.

\* cited by examiner

BLADE OUTER AIR SEAL

BACKGROUND

As known, gas turbine engines, and other turbomachines, include multiple sections, such as a fan section, a compressor section, a combustor section, a turbine section, and an exhaust section. Air moves into the engine through the fan section. Airfoil arrays in the compressor section rotate to compress the air, which is then mixed with fuel and combusted in the combustor section. The products of combustion are expanded to rotatably drive airfoil arrays in the turbine section. Rotating the airfoil arrays in the turbine section drives rotation of the fan and compressor sections.

A blade outer air seal arrangement includes multiple blade outer air seals (BOAS) circumferentially disposed about at least a portion of the airfoil arrays. As known, the blade outer air seal environment is exposed to temperature extremes and other harsh environmental conditions, which may affect the integrity of the blade outer air seal. Thus, effective cooling is typically desired to protect the BOAS.

SUMMARY

In accordance with various embodiments, disclosed is a blade outer air seal assembly comprising: a main body portion that extends generally axially, with respect to a central axis, from a leading edge portion of the main body portion to a trailing edge portion of the main body portion, wherein the leading edge portion includes a leading edge wall having a undercut profile, along at least a portion of the leading edge wall; at least one attachment portion coupled to the main body portion, the at least one attachment portion configured for attachment to a receiving portion of the turbine, the at least one attachment portion comprising at least one leading attachment portion proximate the leading edge portion; and cooling passages defined within the main body portion, comprising a leading edge cooling passage adjacent to the leading edge wall, and at least one aft cooling passage axially aligned aft of the leading edge cooling passage, wherein the leading edge cooling passage has a leading edge periphery on a side of the leading edge cooling passage adjacent to the leading edge wall, wherein the leading edge periphery runs substantially parallel to the undercut profile of the leading edge wall. In one embodiment, the leading edge periphery is configured to substantially maintain a distance between the leading edge wall and the leading edge cooling passage of between 0.05 cm and 0.2 cm. In one embodiment, the leading edge periphery is configured to substantially maintain a constant distance between the leading edge wall and the leading edge cooling passage. In one embodiment, the blade outer air seal assembly comprises a plurality of axially aligned aft cooling passages comprising top linear edges and bottom linear edges, wherein the top linear edges define a ceiling line of the plurality of aft cooling passages, and the bottom linear edges define a floor line of the plurality of aft cooling passages, wherein the leading edge cooling passage has at least a bottom edge which deviates from the floor line of the plurality of aft cooling passages. In one embodiment, the aft cooling passages comprise an elongated geometry comprising at least one of a discorectangle rounded rectangle, or rectangle. In one embodiment, the leading edge cooling passage comprises at least one of a tilted, undercut, or bent configuration with respect to the aft cooling passages. In one embodiment, the leading edge cooling passage is tilted with respect to the at least one aft cooling passage. In one embodiment, the leading edge cooling passage is bent with respect to the at least one aft cooling passage. In one embodiment, the leading edge cooling passage is undercut with respect to the at least one aft cooling passage. In one embodiment, the leading edge cooling passage is undercut and at least one of tilted or bent with respect to the at least one aft cooling passage.

In accordance with various embodiments, disclosed is a blade outer air seal assembly for a turbine engine comprising: a main body portion that extends generally axially, with respect to a central axis of the turbine engine, from a leading edge portion of the main body portion to a trailing edge portion of the main body portion, wherein the leading edge portion includes a leading edge wall having a undercut profile, along at least a portion of the leading edge wall; and cooling passages defined within the main body portion, comprising a leading edge cooling passage adjacent to the leading edge wall, and at least one aft cooling passage axially aligned aft of the leading edge cooling passage, wherein the at least one aft cooling passage comprises a top linear edge define a ceiling line, and a bottom linear edge define a floor line, wherein the leading edge cooling passage deviates from the axial alignment of the at least one aft cooling passage, wherein the leading edge cooling passage has a leading edge periphery on a side of the leading edge cooling passage adjacent to the leading edge wall, wherein the leading edge periphery generally conforms to the undercut profile of the leading edge wall. In one embodiment, the leading edge periphery is configured to substantially maintain a distance between the leading edge wall and the leading edge cooling passage of between 60 mm and 120 mm. In one embodiment, the leading edge periphery is configured to substantially maintain a constant distance between the leading edge wall and the leading edge cooling passage. In one embodiment, the blade outer air seal assembly comprises a plurality of axially aligned aft cooling passages, comprising top linear edges defining the ceiling line, and bottom linear edges defining the floor line, wherein the aft cooling passages comprise an elongated geometry comprising at least one of a discorectangle rounded rectangle, or rectangle. In one embodiment, the leading edge cooling passage comprises at least one of a tilted, undercut, or bent configuration with respect to the at least one aft cooling passage. In one embodiment, the leading edge cooling passage projects above the ceiling line. In one embodiment, the leading edge cooling passage is undercut and at least one of tilted or bent with respect to the at least one aft cooling passage.

In accordance with various embodiments, disclosed is a turbine engine comprising a blade outer air seal assembly, the blade outer air seal assembly comprising: a main body portion that extends generally axially, with respect to a central axis of the turbine engine, from a leading edge portion of the main body portion to a trailing edge portion of the main body portion, wherein the leading edge portion includes a leading edge wall having a undercut profile, along at least a portion of the leading edge wall; and at least one cooling passage defined within the main body portion and adjacent to the leading edge wall, the at least one cooling passage having a leading edge periphery on a side adjacent to the leading edge wall which runs substantially parallel to the undercut profile of the leading edge wall, and maintains a generally constant distance between the leading edge periphery and the leading edge wall. In one embodiment, the generally constant distance is between 60 mm and 120 mm. In one embodiment, the turbine engine further comprises a plurality of axially aligned aft cooling passages, comprising top linear edges defining a ceiling line, and bottom linear edges defining a floor line, wherein the aft cooling passages comprise an elongated geometry comprising at least one of a discorectangle rounded rectangle, or rectangle, wherein the at least one cooling passage having a leading edge periphery deviates from the axial alignment of the aft cooling passages, and comprises at least one of a tilted, undercut, or bent configuration with respect to the aft cooling passages.

BRIEF DESCRIPTION OF THE DRAWINGS

The drawings described herein are for illustration purposes only and are not intended to limit the scope of the present disclosure in any way. The present disclosure will become more fully understood from the detailed description and the accompanying drawings wherein.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
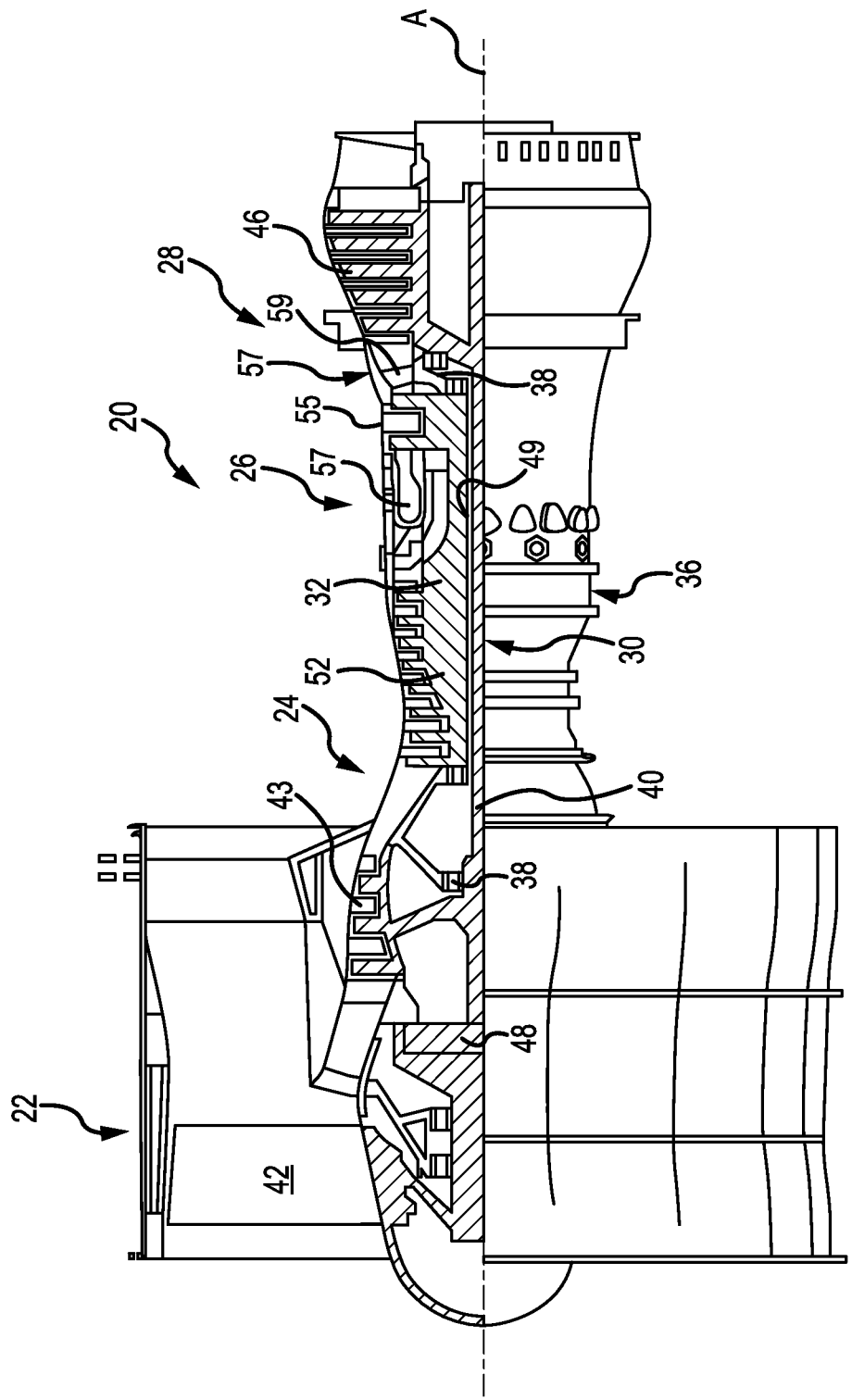
FIG. 1 shows a cross-section of gas turbine engine, according to various embodiments.

According to various embodiments, and with reference to FIG. 1, a gas turbine engine 20 is schematically illustrated. According to various embodiments, gas turbine engine 20 may be a two-spool turbofan that generally incorporates a fan section 22, a compressor section 24, a combustor section 26 and a turbine section 28, for example. Alternative engines might include an augmentor section (not shown) among other systems or features, according to various embodiments. According to various embodiments, the fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures, non-geared turbine engines, and land-based turbines, according to various embodiments.

According to various embodiments, gas turbine engine 20 may generally include a first spool 30 and a second spool 32 mounted for rotation about an engine central axis A relative to an engine static structure 36 via several bearing systems 38. It should be understood that various bearing systems 38 at various locations may alternatively or additionally be provided, according to various embodiments. According to various embodiments, the first spool 30 may generally include a first shaft 40 that interconnects a fan 42, a first compressor 43 and a first turbine 46. According to various embodiments, the first shaft 40 may be connected to the fan 42 through a gear assembly of a fan drive gear system 48 to drive the fan 42 at a lower speed than the first spool 30. According to various embodiments, the second spool 32 may include a second shaft 49 that interconnects a second compressor 52 and second turbine 55. According to various embodiments, the first spool 30 may run at a relatively lower pressure than the second spool 32. It is to be understood that "low pressure" and "high pressure" or variations thereof as used herein are relative terms indicating that the high pressure is greater than the low pressure. According to various embodiments, an annular combustor 57 may be arranged between the second compressor 52 and the second turbine 55. According to various embodiments, the first shaft 40 and the second shaft 49 may be concentric and rotate via bearing systems 38 about the engine central axis A which is collinear with their longitudinal axes, according to various embodiments.

According to various embodiments, the core airflow may be compressed by the first compressor 43 then the second compressor 52, mixed and burned with fuel in the annular combustor 57, then expanded over the second turbine 55 and first turbine 46. According to various embodiments, the first turbine 46 and the second turbine 55 may rotationally drive, respectively, the first spool 30 and the second spool 32 in response to the expansion. According to various embodiments, gas turbine engine 20 may be a high-bypass geared aircraft engine that has a bypass ratio that is greater than about six (6), with an example embodiment being greater than ten (10). According to various embodiments, the gear assembly of the fan drive gear system 48 may be an epicyclic gear train, such as a planetary gear system or other gear system, with a gear reduction ratio of greater than about 2.3:1 and the first turbine 46 may have a pressure ratio that is greater than about 5, for example. According to various embodiments, the first turbine 46 pressure ratio is pressure measured prior to inlet of first turbine 46 as related to the pressure at the outlet of the first turbine 46 prior to an exhaust nozzle. According to various embodiments, first turbine 46 may have a maximum rotor diameter and the fan 42 may have a fan diameter such that a ratio of the maximum rotor diameter divided by the fan diameter is less than 0.6. It should be understood, however, that the above parameters are only exemplary.

A significant amount of thrust may be provided by the bypass flow B due to the high bypass ratio. According to various embodiments, the fan section 22 of the gas turbine engine 20 may be designed for a particular flight condition—typically cruise at an airspeed of 0.8 Mach and altitude of 35,000 feet (10.67 km). The flight condition of 0.8 Mach and 35,000 feet (10.67 km) engine operating at its best fuel consumption. To make an accurate comparison of fuel consumption between engines, fuel consumption is reduced to a common metric which is applicable to all types and sizes of turbojets and turbofans. The term that may be used to compare fuel consumption between engines is thrust specific fuel consumption, or TSFC. This is an engine's fuel consumption in pounds per hour divided by the net thrust. Stated another way, TSFC is the amount of fuel required to produce one pound of thrust. The TSFC unit is pounds per hour per pounds of thrust (lb/hr/lb Fn). When the reference is to a turbojet or turbofan engine, TSFC is often simply called specific fuel consumption, or SFC. "Low fan pressure ratio" is the pressure ratio across the fan blade alone, without a fan exit guide Vane system. The low fan pressure ratio as disclosed herein according to one non-limiting embodiment is less than about 1.45. "Low corrected fan tip speed" is the actual fan tip speed in feet per second divided by an industry standard temperature correction of $[(T_{ram}° R)/(518.7° R)]^{0.5}$. The "Low corrected fan tip speed" as disclosed herein according to one non-limiting embodiment may be less than about 1150 feet per second (350 m/s).

Figure 2:
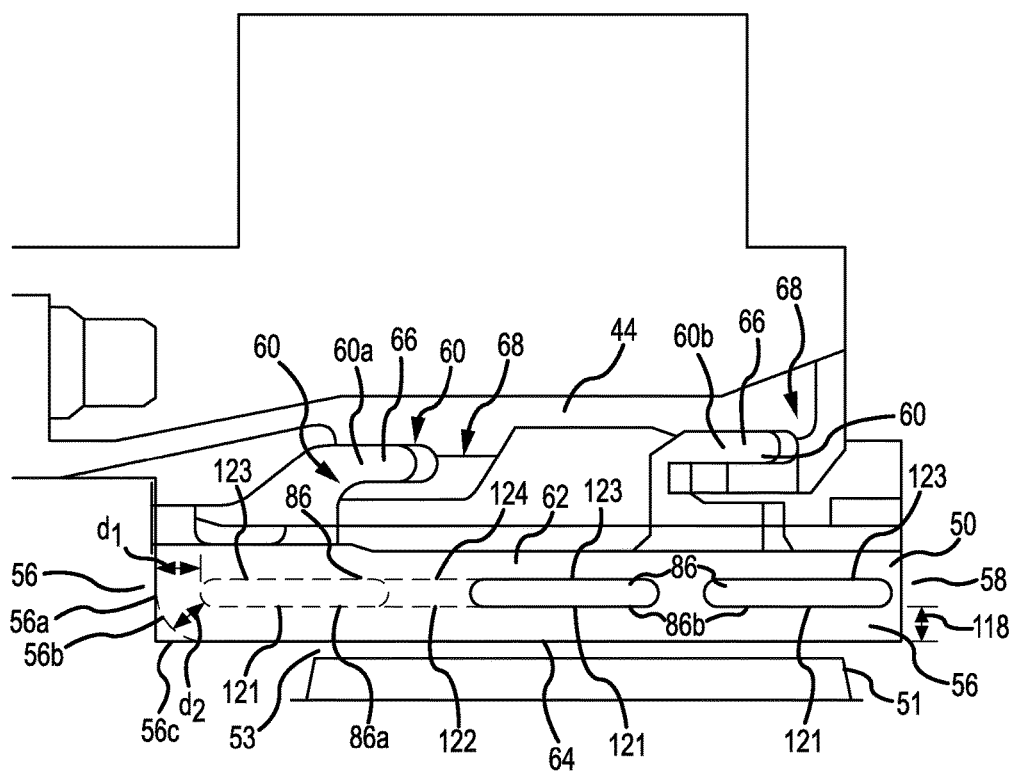
FIG. 2 shows a blade outer air seal (BOAS) assembly attached to an inner engine case structure of the gas turbine engine of FIG. 1, according to various embodiments.

According to various embodiments, FIG. 2 shows a blade outer air seal (BOAS) assembly 50 attached to an inner engine case structure 44 of the gas turbine engine 20 by a receiving portion 68 of the inner engine case structure 44. According to various embodiments, the BOAS assembly 50 may be located within the turbine section 28 of the gas turbine engine 20, for example. According to various embodiments, the BOAS assembly 50 faces turbine blade 51 to define a radial tip clearance 53 between the turbine blade 51 and the BOAS assembly 50. Although only one BOAS assembly 50 is shown, a number of BOAS assembly 50 may be arranged circumferentially about engine axis A to form a shroud, according to various embodiments. According to various embodiments, the BOAS assemblies 50 may alternatively be formed as a unitary BOAS structure, with the same features described herein.

Figure 3A:
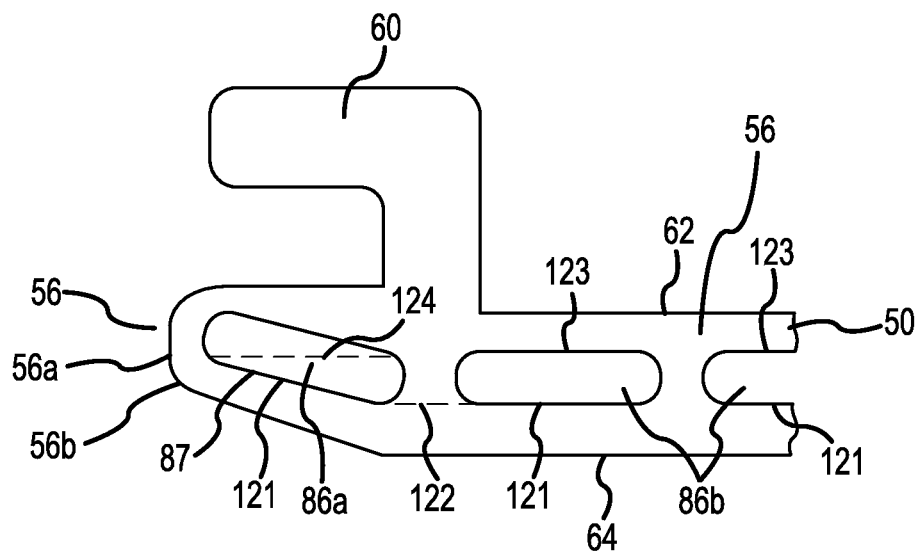
FIG. 3A shows a BOAS assembly having a tilted leading edge cooling passage, according to various embodiments.
Figure 3B:
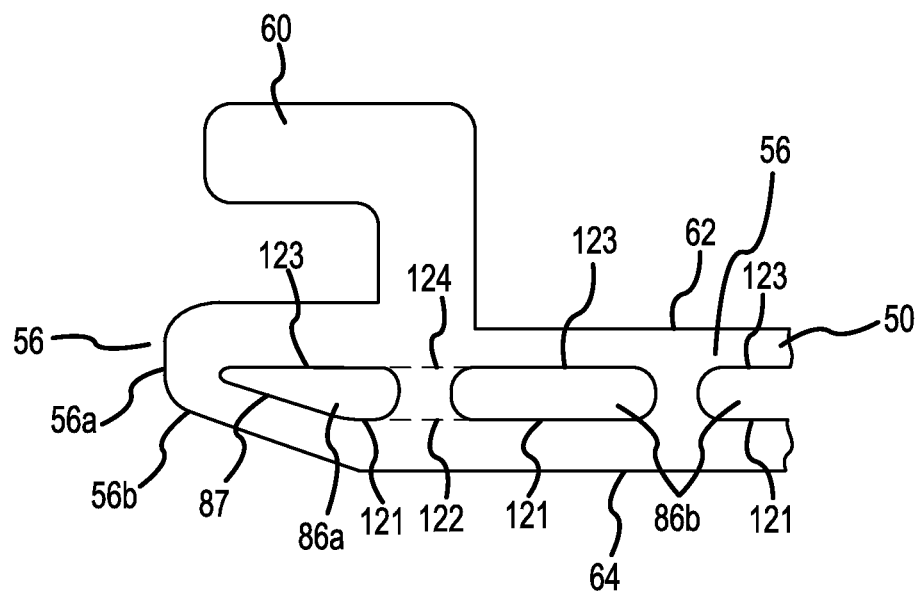
FIG. 3B shows a BOAS assembly having an undercut leading edge cooling passage, according to various embodiments.
Figure 3C:
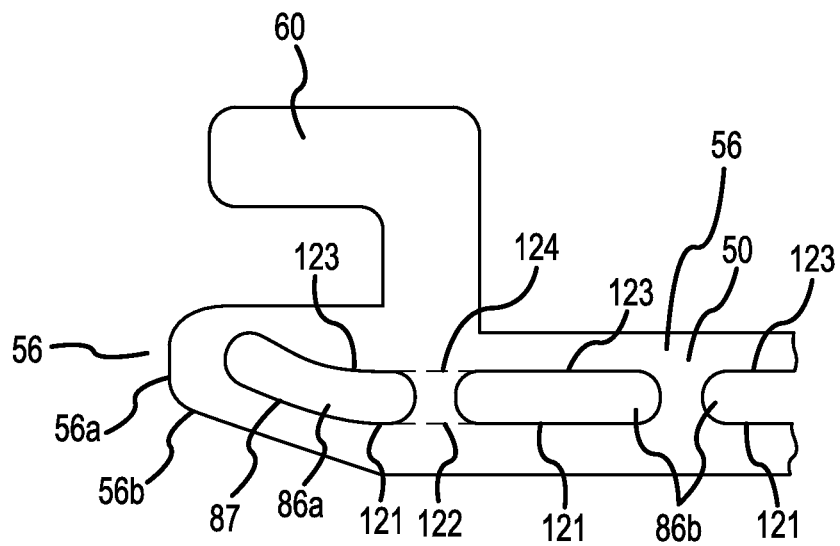
FIG. 3C shows a BOAS assembly having a bent leading edge cooling passage, according to various embodiments.
Figure 3D:
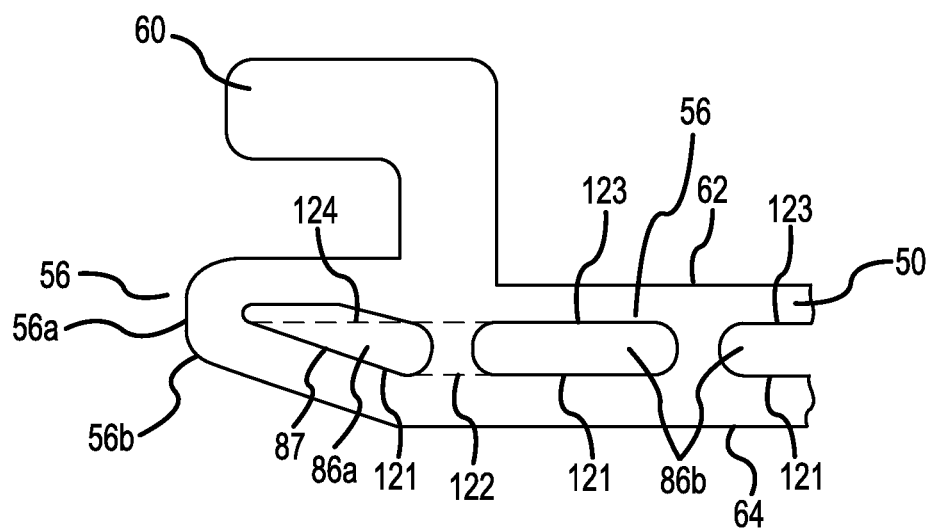
FIG. 3D shows a BOAS assembly having a tilted and undercut leading edge cooling passage, according to various embodiments.

According to various embodiments, and with reference to FIGS. 2-3D, the BOAS assembly 50 may include a main body portion 54 that extends generally axially from a leading edge portion 56 to a trailing edge portion 58 and from a radially outward facing surface 62 at an outboard side of BOAS assembly 50 to a radially inward facing surface 64 at an inboard side of BOAS assembly 50. According to various embodiments, the BOAS assembly 50 also includes at least one leading attachment portion 60a (also referred to as "attachment portions 60a") disposed at or near the leading edge portion 56 and at least one trailing attachment portion 60b (also referred to as "attachment portions 60b") disposed at or near the trailing edge portion 58. According to various embodiments, each of the attachment portions 60a, 60b may define a flange 66. According to various embodiments, flange 66 of attachment portions 60a and/or 60b may extend in an axially aft direction, as shown in the figures. According to various embodiments, flange 66 of attachment portions 60a and/or 60b may alternatively extend in an axially fore direction.

According to various embodiments, each axially extending flange 66 corresponds to the receiving portion 68 of the inner engine case structure 44 to support and attach the BOAS assembly 50 (Shown in FIG. 2). According to various embodiments, the attachment portions 60a may be circumferentially offset, circumferentially aligned, or a combination of both, from the attachment portions 60b in response to BOAS assembly 50 parameters.

According to various embodiments, the leading edge portion 56 of BOAS assembly 50 includes a leading edge wall 56a having an undercut profile 56b, along at least a portion of the leading edge wall 56a, as shown in FIGS. 3A-D, and indicated by broken lines in FIG. 2. The undercut profile 56b, which may have various configurations, deviates away from a 90 degree geometry 56c (indicated by broken lines in FIG. 2). According to various embodiments, undercut profile 56b may include a beveled or chamfered profile (e.g. 30 degree chamfer, 45 degree chamfer, etc.), a radial or elliptical transition. According to various embodiments, the undercut profile 56b of leading edge wall 56a, may improve gas flow transition across leading edge wall 56a, and to prevent a stagnation region at the leading edge portion 56.

According to various embodiments, the BOAS assembly 50 further comprises cooling passages 86 defined within the main body portion 54. According to various embodiments, cooling passages 86 include a leading edge cooling passage 86a adjacent to the leading edge wall 56a, and aft cooling passages 86b axially aligned aft of the leading edge cooling passage 86a. According to various embodiments, aft cooling passages 86b, each comprise an elongated geometry with a bottom linear edge 121 and a top linear edge 123, wherein bottom linear edges 121 generally defining a floor line 122 of the aft cooling passages 86b, and top linear edges 123, generally defining a ceiling line 124 of the aft cooling passages 86b. According to various embodiments, the elongated geometry of aft cooling passages 86b comprises rounded ends, and may include a discorectangle or stadium geometry, or rounded rectangle, according to various embodiments. Other similar geometries may include a rectangle geometry, according to various embodiments.

According to various embodiments, as shown in FIGS. 3A-D, leading edge cooling passage 86a has a leading edge periphery 87 (also referred to as "conforming periphery 87") which generally conforms to the undercut profile 56b of the leading edge wall 56a, on the side adjacent to the leading edge wall 56a. According to various embodiments, the conforming periphery 87 is configured to substantially maintain a distance between the leading edge wall 56a and leading edge cooling passage 86a, of between 60 mm and 120 mm, thus creating a desirable wall thickness between the leading edge wall 56a and leading edge cooling passage 86a, which would otherwise be compromised if the leading edge cooling passage 86a were to conform with the geometry and alignment of the aft cooling passages 86b. This is due to the fact that the undercut profile 56b creates an uneven distance distribution between the leading edge wall 56a and leading edge cooling passage 86a. Consequently, a distance d1, (with brief reference back to FIG. 2), between a portion of the leading edge wall 56a having the 90 degree geometry 56c may be shortened to a distance d2 at a portion of the leading edge wall 56a having the undercut profile 56b, as shown in FIG. 2. If d2 is too small, local wall thickness may decrease below a desirable a wall thickness. If d2 is too large, local wall thickness may exceed a desirable value. These are undesirable, as a reduced wall thickness may subject the BOAS assembly 50 to casting defects, while a high wall thickness may adversely affect the cooling efficiency of the BOAS assembly 50.

According to various embodiments, a wall thickness may include a generally constant wall thickness between the leading edge periphery 87 and the leading edge wall 56a.

According to various embodiments, and with reference to FIGS. 3A-D, leading edge cooling passage 86a may be tilted, undercut, and/or bent, in comparison to aft cooling passages 86b, such that the leading edge periphery 87 conforms to the undercut profile.

According to various embodiments, the leading edge cooling passage 86a may be tilted with respect to aft cooling passages 86b, as shown in FIG. 3A, wherein its bottom linear edge 121 is angled with respect to floor line 122 formed by the aft cooling passages 86b. According to various embodiments, bottom linear edge 121 of leading edge cooling passage 86a runs substantially parallel to the undercut profile 56b of the leading edge wall 56a, forming the leading edge periphery 87. According to various embodiments, leading edge cooling passage 86a having a tilted configuration may have a geometric configuration similar to the elongated geometry of aft cooling passages 86b. According to various embodiments, leading edge cooling passage 86a having a tilted configuration may project above the ceiling line 124 formed by the top linear edge 123 of the aft cooling passages 86b.

According to various embodiments, the leading edge cooling passage 86a may be undercut with respect to aft cooling passages 86b, as shown in FIG. 3B. According to various embodiments, leading edge cooling passage 86a may be coaxially aligned with aft cooling passages 86b, and diagonally undercut through its bottom linear edge 121, wherein the diagonal undercut is angled with respect to the floor line 122 formed by the aft cooling passages 86b. According to various embodiments, leading edge cooling passage 86a may be diagonally undercut through its bottom linear edge 121, wherein the diagonal undercut runs parallel or substantially parallel to the undercut profile 56b of the leading edge wall 56a, forming the leading edge periphery 87. According to various embodiments, leading edge cooling passage 86a having an undercut configuration may be confined within the ceiling line 124 and floor line 122 formed by the aft cooling passages 86b.

According to various embodiments, the leading edge cooling passage 86a may be bent, with respect to aft cooling passages 86b, as shown in FIG. 3C, such that only a portion of the leading edge cooling passage 86a is tilted. In a bent configuration, a segment of bottom linear edge 121 of leading edge cooling passage 86a, is angled with respect to with respect to floor line 122 formed by the aft cooling passages 86b. According to various embodiments, the angled segment of bottom linear edge 121 of leading edge cooling passage 86a having a bent configuration, runs parallel or substantially parallel to the undercut profile 56b of the leading edge wall 56a, forming the leading edge periphery 87, while the remaining segment may be coaxially aligned with aft cooling passages 86b, as shown in the Figure. According to various embodiments, leading edge cooling passage 86a having a bent configuration may project above the ceiling line 124 formed by the top linear edge 123 of the aft cooling passages 86b.

According to various embodiments, the leading edge cooling passage 86a may both tilted and undercut, as shown in FIG. 3D, or both bent and undercut. According to various embodiments, bent or tilted cooling passage 86a may be undercut to eliminate its projection above ceiling line 124, such that it is confined within the ceiling line 124 and floor line 122 formed by the aft cooling passages 86b. According to various embodiments, bent or tilted cooling passage 86a may be undercut such that its projection above ceiling line 124 is reduced (as shown in FIG. 3d, for a tilted configuration).

According to various embodiments, the BOAS assembly 50 may be fabricated from a material such as an austenitic nickel-chromium-based alloy such as Inconel® which is available from Special Metals Corporation of New Hartford, N.Y., USA. According to various embodiments, the BOAS assembly 50 may be fabricated from such alloy having sulfur levels at or below 1 part per million (PPM), though other types of material may be used, according to various embodiments. According to various embodiments, a distance 118 between the floor line 122 of the plurality of cooling passages 86 and the radially inward facing surface 64 may be between 0.02 inches (0.05 cm) and 0.080 inches (0.2 cm). For example, the distance 118 may be about 0.027 inches (0.069 cm), according to various embodiments. According to various embodiments, the BOAS assembly 50 may include a thermal barrier coating (e.g., a metallic or based coating, multiple layers of coating such as a thermal layer and a bond layer, etc.) disposed on the radially inward facing surface 64 of the main body portion 54, according to various embodiments.

With reference to FIGS. 1 and 2, during gas turbine engine 20 operation, the BOAS assembly 50 is subjected to different thermal loads and environmental conditions. The BOAS assembly 50 is in fluid communication with an airflow source, such as an upstream compressor in the compressor section 24 or other source, which provides cooling airflow, such as bleed compressor air. This provides varying levels of cooling to different areas of the BOAS assembly 50 and effectively communicate thermal energy away from the BOAS assembly 50 and the tip of the rotating turbine blade 51.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A blade outer air seal assembly for a turbine engine, the blade outer air seal comprising:
    a main body portion that extends generally axially, with respect to an engine central axis of the turbine engine, from a leading edge portion of the main body portion to a trailing edge portion of the main body portion, wherein the leading edge portion includes a leading edge wall having a undercut profile, along at least a portion of the leading edge wall;
    at least one attachment portion coupled to the main body portion, the at least one attachment portion configured for attachment to a receiving portion, the at least one attachment portion comprising at least one leading attachment portion proximate the leading edge portion; and
    cooling passages defined within the main body portion, comprising a leading edge cooling passage adjacent to the leading edge wall, and at least one aft cooling passage axially aligned aft of the leading edge cooling passage, wherein the leading edge cooling passage has a leading edge periphery on a side of the leading edge cooling passage adjacent to the leading edge wall, wherein the leading edge periphery runs substantially parallel to the undercut profile of the leading edge wall along an entire length of the undercut profile;
    wherein the blade outer air seal assembly comprises a plurality of axially aligned aft cooling passages comprising top linear edges and bottom linear edges, wherein the top linear edges are the radially outward edges, relative to the engine central axis, of the aft cooling passages that define a ceiling line of the plurality of aft cooling passages, and the bottom linear edges are the radially inward edges, relative to the engine central axis, of the aft cooling passages that define a floor line of the plurality of aft cooling passages, wherein the leading edge cooling passage has at least a bottom edge which deviates from the floor line of the plurality of aft cooling passages.

2. The blade outer air seal assembly of claim 1, wherein the leading edge periphery is configured to substantially maintain a distance between the leading edge wall and the leading edge cooling passage of between 0.05 cm and 0.2 cm.

3. The blade outer air seal assembly of claim 1, wherein the leading edge periphery is configured to substantially maintain a constant distance between the leading edge wall, including the entire length of the undercut profile, and the leading edge cooling passage.

4. The blade outer air seal assembly of claim 1, wherein the aft cooling passages comprise an elongated geometry comprising at least one of a discorectangle rounded rectangle, or rectangle.

5. The blade outer air seal assembly of claim 1, wherein the leading edge cooling passage comprises at least one of a tilted, undercut, or bent configuration with respect to the aft cooling passages.

6. The blade outer air seal assembly of claim 1, wherein the leading edge cooling passage is tilted with respect to the at least one aft cooling passage.

7. The blade outer air seal assembly of claim 1, wherein the leading edge cooling passage is bent with respect to the at least one aft cooling passage.

8. The blade outer air seal assembly of claim 1, wherein the leading edge cooling passage is undercut with respect to the at least one aft cooling passage.

9. The blade outer air seal assembly of claim 1 wherein the leading edge cooling passage is undercut and at least one of tilted or bent with respect to the at least one aft cooling passage.

10. A blade outer air seal assembly for a turbine engine having an engine central axis, the blade outer air seal comprising:
    a main body portion that extends generally axially, with respect to the engine central axis, from a leading edge portion of the main body portion to a trailing edge portion of the main body portion, wherein the leading edge portion includes a leading edge wall having a undercut profile, along at least a portion of the leading edge wall; and
    cooling passages defined within the main body portion, comprising a leading edge cooling passage adjacent to the leading edge wall and at least one aft cooling passage aft of the leading edge cooling passage,
    wherein the at least one aft cooling passage comprises a first top linear edge that is a first radially outward edge, relative to the engine central axis, of the at least one aft cooling passage and that defines a first ceiling line,
    wherein the at least one aft cooling passage comprises a first bottom linear edge that is a first radially inward edge, relative to the engine central axis, of the at least one aft cooling passage and that defines a first floor line,
    wherein the leading edge cooling passage comprises a second top linear edge that is a second radially outward edge, relative to the engine central axis, of the leading edge passage and that defines a second ceiling line,
    wherein the leading edge cooling passage comprises a second bottom linear edge that is a second radially inward edge, relative to the engine central axis, of the leading edge passage and that defines a second floor line,
    wherein the second floor line is aligned with the first floor line,
    wherein the second top linear edge is radially outward of the first top linear edge, wherein the leading edge cooling passage has a leading edge periphery on a side of the leading edge cooling passage adjacent to the leading edge wall,
    wherein the leading edge periphery generally conforms to the undercut profile of the leading edge wall.

11. The blade outer air seal assembly of claim 10, wherein the leading edge periphery is configured to substantially maintain a distance between the leading edge wall and the leading edge cooling passage of between 0.05 cm and 0.2.

12. The blade outer air seal assembly of claim 10, wherein the leading edge periphery is configured to substantially maintain a constant distance between the leading edge wall, including an entire length of the undercut profile, and the leading edge cooling passage.

13. The blade outer air seal assembly of claim 10, wherein the leading edge cooling passage comprises at least one of a tilted, undercut, or bent configuration with respect to the at least one aft cooling passage.

14. The blade outer air seal assembly of claim 10, wherein the leading edge cooling passage is undercut and at least one of tilted or bent with respect to the at least one aft cooling passage.

15. A turbine engine comprising a blade outer air seal assembly, the blade outer air seal assembly comprising:
- a main body portion that extends generally axially, with respect to an engine central axis of the turbine engine, from a leading edge portion of the main body portion to a trailing edge portion of the main body portion, wherein the leading edge portion includes a leading edge wall having a undercut profile, along at least a portion of the leading edge wall; and
- at least one cooling passage defined within the main body portion and adjacent to the leading edge wall, the at least one cooling passage having a leading edge periphery on a side adjacent to the leading edge wall which runs substantially parallel to the undercut profile of the leading edge wall along an entire length of the undercut profile, and maintains a generally constant distance between the leading edge periphery and the leading edge wall, including the entire length of the undercut profile;
- wherein the blade outer air seal assembly comprises a plurality of axially aligned aft cooling passages comprising top linear edges and bottom linear edges, wherein the top linear edges are the radially outward edges, relative to the engine central axis, of the aft cooling passages that define a ceiling line of the plurality of aft cooling passages, and the bottom linear edges are the radially inward edges, relative to the engine central axis, of the aft cooling passages that define a floor line of the plurality of aft cooling passages, wherein the leading edge cooling passage has at least a bottom edge which deviates from the floor line of the plurality of aft cooling passages.

16. The turbine engine of claim 15, wherein the generally constant distance is between 0.05 cm and 0.2 cm.

17. The turbine engine of claim 15, further comprising a plurality of axially aligned aft cooling passages, comprising top linear edges defining a ceiling line, and bottom linear edges defining a floor line, wherein the aft cooling passages comprise an elongated geometry comprising at least one of a discorectangle rounded rectangle, or rectangle, wherein the at least one cooling passage having a leading edge periphery deviates from the axial alignment of the aft cooling passages, and comprises at least one of a tilted, undercut, or bent configuration with respect to the aft cooling passages.

* * * * *